United States Patent
Koie et al.

(10) Patent No.: US 7,808,686 B2
(45) Date of Patent: Oct. 5, 2010

(54) PICTURE EDITOR

(75) Inventors: Kazuaki Koie, Tokoname (JP); Naoki Tanjima, Nagoya (JP); Naomi Yamamoto, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 1197 days.

(21) Appl. No.: 11/411,608

(22) Filed: Apr. 26, 2006

(65) Prior Publication Data
US 2006/0256410 A1    Nov. 16, 2006

(30) Foreign Application Priority Data
May 13, 2005    (JP) .............................. 2005-140880

(51) Int. Cl.
*H04N 1/46*    (2006.01)
*G06K 9/60*    (2006.01)

(52) U.S. Cl. .................. 358/540; 358/1.9; 358/518; 358/520; 358/527; 358/537; 382/164; 382/165; 382/166; 382/167; 382/266; 382/272; 382/275; 382/278; 382/282; 382/309

(58) Field of Classification Search .............. 358/1.9, 358/2.1, 518, 520, 527, 537, 540; 382/164, 382/165, 167, 266, 272, 274, 275, 278, 282, 382/283, 284, 286, 299, 302, 307, 309
See application file for complete search history.

(56) References Cited

U.S. PATENT DOCUMENTS

| | | | |
|---|---|---|---|
| 5,461,493 A * | 10/1995 | Venable ...................... | 358/520 |
| 6,177,116 B1 | 1/2001 | Villagran et al. | |
| 6,235,333 B1 | 5/2001 | Villagran et al. | |
| 6,461,663 B1 | 10/2002 | Villagran et al. | |
| 6,519,360 B1 | 2/2003 | Tanaka | |
| 6,544,580 B1 | 4/2003 | Villagran et al. | |
| 6,886,131 B1 | 4/2005 | Kusama et al. | |

(Continued)

FOREIGN PATENT DOCUMENTS

EP    1 276 057 A2    1/2003

(Continued)

OTHER PUBLICATIONS

Corridoni J M et al., Image query by semantical color content, Proceedings of The Workshop on Advanced Visual Interfaces AVI, May 27, 1996, pp. 213-222, XP-002289265.

*Primary Examiner*—King Y Poon
*Assistant Examiner*—Steven Kau
(74) *Attorney, Agent, or Firm*—Day Pitney LLP

(57) ABSTRACT

It is intended to provide a picture editor which displays the color pictorial data matching designated pictorial information, according to pictorial information code of the analyzed color pictorial data of a plurality of color pictures added to the color pictorial data, picks out and displays the color pictorial data matching designated pictorial information. For this purpose, the information code of each pictorial information on brightness, saturation, and hue of the color pictorial data, which is analyzed, digitized, and averaged in a pictorial data analyzing unit, is added to the color pictorial data in a retrieval information adding unit. According to the color pictorial data to which the information code is added, a retrieving unit picks out the color pictorial data matching designated pictorial information. A video monitor displays the retrieved color pictorial data.

9 Claims, 16 Drawing Sheets

U.S. PATENT DOCUMENTS

| | | |
|---|---|---|
| 6,994,800 B1 | 2/2006 | Villagran et al. |
| 7,060,317 B2 | 6/2006 | Villagran et al. |
| 7,060,318 B2 | 6/2006 | Villagran et al. |
| 7,081,266 B2 | 7/2006 | Villagran et al. |
| 7,356,204 B2 * | 4/2008 | Takahashi ............... 382/309 |
| 7,483,168 B2 * | 1/2009 | Kuwata et al. ............ 358/1.9 |
| 2003/0009454 A1 | 1/2003 | Kim et al. |
| 2005/0165847 A1 | 7/2005 | Kusama et al. |
| 2005/0165848 A1 | 7/2005 | Kusama et al. |

FOREIGN PATENT DOCUMENTS

| | | |
|---|---|---|
| EP | 1 361 506 A2 | 11/2003 |
| JP | 101 26724 | 5/1998 |
| JP | 11-096364 | 4/1999 |
| JP | 2000-312290 | 11/2000 |
| JP | 2003-123071 | 4/2003 |

* cited by examiner

BLOCK DIAGRAM OF PICTURE EDITOR

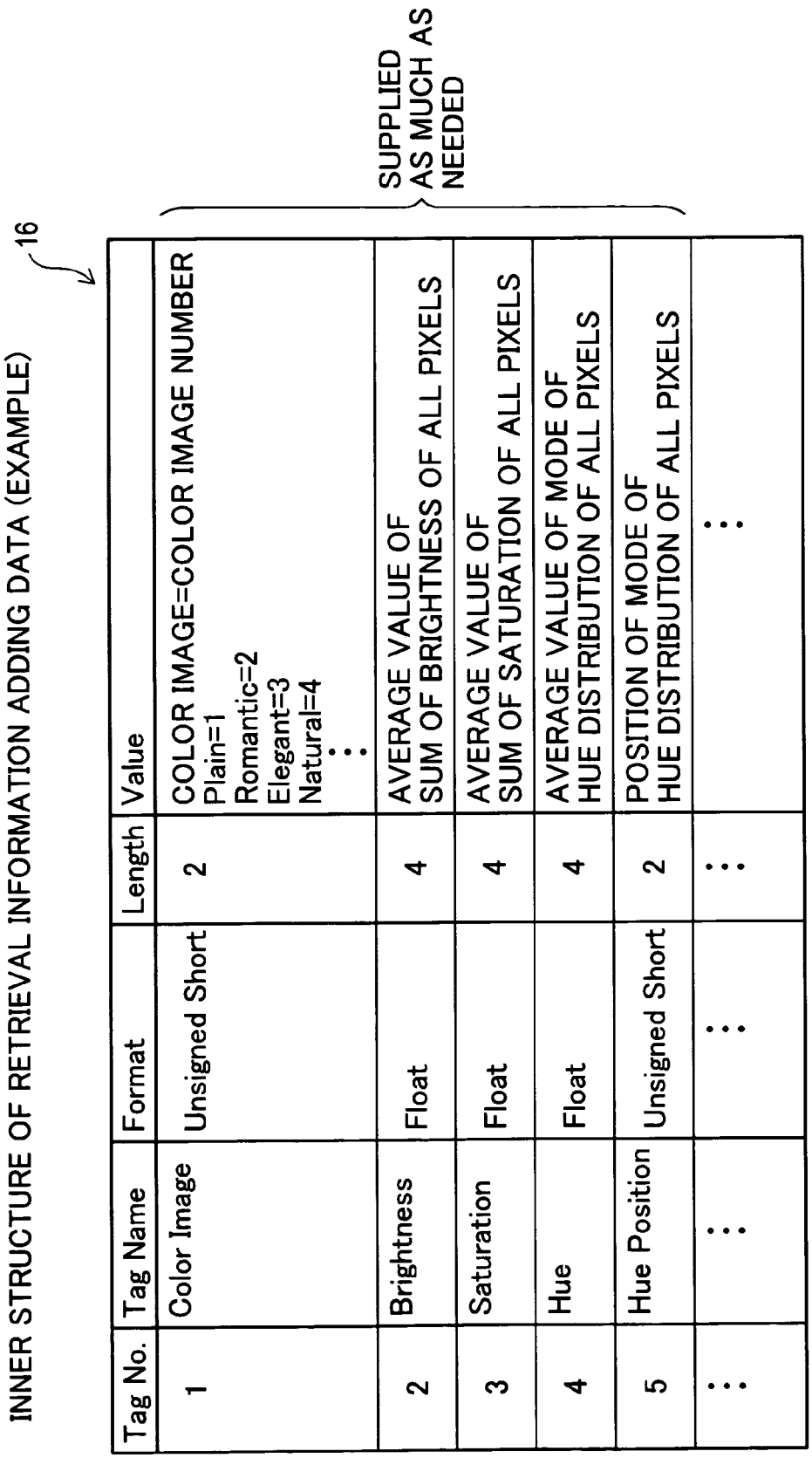

FIG. 3

INNER STRUCTURE OF RETRIEVAL INFORMATION ADDING DATA (EXAMPLE)

| Tag No. | Tag Name | Format | Length | Value |
|---|---|---|---|---|
| 1 | Color Image | Unsigned Short | 2 | COLOR IMAGE=COLOR IMAGE NUMBER<br>Plain=1<br>Romantic=2<br>Elegant=3<br>Natural=4<br>... |
| 2 | Brightness | Float | 4 | AVERAGE VALUE OF SUM OF BRIGHTNESS OF ALL PIXELS |
| 3 | Saturation | Float | 4 | AVERAGE VALUE OF SUM OF SATURATION OF ALL PIXELS |
| 4 | Hue | Float | 4 | AVERAGE VALUE OF MODE OF HUE DISTRIBUTION OF ALL PIXELS |
| 5 | Hue Position | Unsigned Short | 2 | POSITION OF MODE OF HUE DISTRIBUTION OF ALL PIXELS |
| ... | ... | ... | ... | ... |

SUPPLIED AS MUCH AS NEEDED (rows 2-5 and beyond)

FIG. 4

MAKER NOTE AREA DATA SROTING AREA

| OFFSET | DESCRIPTION OF INFORMATION |
|---|---|
| 0 | MAKER NAME+ 0x00 |
| 6 | reserve |
| 8 | ENTRY NUMBER OF Tag |
| 10 | DATA OF Tag 1 (Tag No+DATA FORMAT+ NUMBER OF DATA +DATA) |
| 22 | DATA OF Tag 2 |
| ... | ... |
| 10+12*(N−1) | DATA OF Tag N |

SUPPLIED AS MUCH AS NEEDED

RETRIEVAL INFORMATION ADD PROCESS(2/3)

FIG. 10

TABLE OF RANGES FOR COLOR-IMAGE AUTOMATIC SETTING

| COLOR IMAGE NUMBER | COLOR IMAGE | V/N | S/N | MAX h(i)/N | i |
|---|---|---|---|---|---|
| 1 | Plain | 0.45~0.71 | 0.41~0.79 | 0.03~0.08 | 26~57 |
| 2 | Romantic | 0.63~0.78 | 0.28~0.42 | 0.19~0.23 | 15~22 |
| 3 | Elegant | 0.30~0.67 | 0.58~0.84 | 0.29~0.36 | 70~85 |
| 4 | Natural | 0.75~0.84 | 0.32~0.57 | 0.05~0.11 | 44~78 |
| ... | ... | ... | ... | ... | ... |

FIG. 11 MANUAL SETTING OF COLOR IMAGE TO LOADED PICTURE

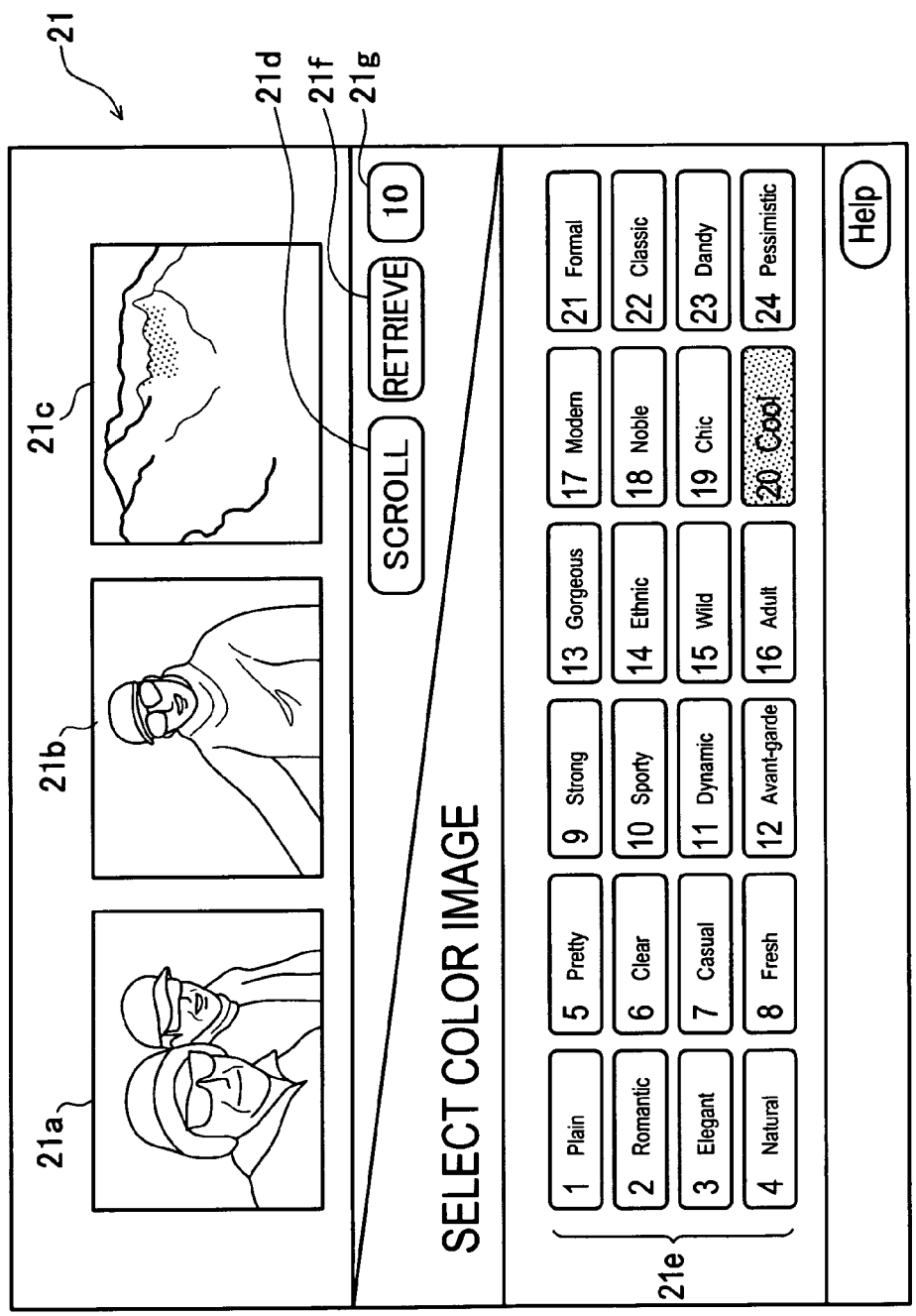
FIG. 16 AUTOMATIC RETRIEVAL OF DESIRED-COLOR-IMAGE PICTURE FROM ENTIRE COLOR PICTORIAL DATA

PICTURE EDITOR

TECHNICAL FIELD

The disclosure relates to a picture editor which can analyze color pictorial data of a plurality of color pictures to obtain pictorial information code, add the pictorial information code to the color pictorial data, pick out and display the color pictorial data matching designated pictorial information, according to the pictorial information code.

BACKGROUND

As significant proliferation of personal computers (PC) proceeds, a digital still camera (hereinafter, a "digital camera") for providing pictures to be displayed in the PC has been also widely diffused in recent years. Using the PC and the digital camera increases works of selecting some pictures to be printed from the pictures loaded into the PC from the digital camera, and of selecting some pictures which match the image from the loaded pictures to make a scrapbook. A user selects the picture from an index of the pictures displayed in a video monitor with a cursor stopping at the desired image after moving along the pictures one by one from the first picture. Therefore, even if it is known that the desired picture is in the last, the user needs to move the cursor along the pictures one by one to the last, which takes a lot of time to select the picture.

To solve the above problem, Japanese patent publication laid-open No. H10(1998)-126724 discloses functions of displaying plural thumbnail pictures in predetermined arrangement imported from a digital camera to a video monitor, showing a cursor in a freely movable way on a screen of the video monitor, acquiring its position (coordinate), considering a picture on which the cursor is placed as a printing output picture candidate, fetching a picture of high resolution corresponding to the selected thumbnail picture from the digital camera to a memory when confirmation is inputted, showing the picture on the video monitor, and adding an index to the displayed picture.

The picture selecting process disclosed in the '724 publication is the process in which the plural pictures loaded to the memory are displayed as an m x n array in a predetermined size on a displaying device, and the picture on which the cursor is placed is considered as the printing output picture candidate. Thus, the process still has the problem that it takes much time to select the pictures. Even when it is intended to select the picture of the bright and intense yellow image, it is not clear whether the picture has the brightest and the most intense image among the plural pictures loaded to the memory.

SUMMARY

At least some example aspects of the disclosure has been made in view of the above circumstances and has an object to overcome the above problems and to provide a picture editor which can analyze color pictorial data of a plurality of color pictures to obtain pictorial information code, add the pictorial information code to the color pictorial data, pick out and display the color pictorial data matching designated pictorial information, according to the pictorial information code.

To achieve the purpose of the disclosure, there is provided a picture editor comprising: a pictorial data storing unit that stores color pictorial data of a plurality of pictures; a pictorial data analyzing unit that performs an operation to analyze and digitize each kind of pictorial information on brightness, saturation and hue of the color pictorial data stored in the pictorial data storing unit; an average data operation unit that performs an operation to average the pictorial information analyzed in the pictorial data analyzing unit; a first data adding unit that adds an encoded pictorial information code of the pictorial information averaged in the average data operation unit, to the color pictorial data; a setting unit that sets each kind of the pictorial information; a pick-out unit that picks out the color pictorial data matching the pictorial information set in the setting unit from the color pictorial data of the plurality of the pictures stored in the pictorial data storing unit, based on the pictorial information set in the setting unit and the pictorial information code of the averaged pictorial information added to the color pictorial data in the first data adding unit; and a displaying unit that displays the color pictorial data which is picked out in the pick-out unit.

The picture editor according to the first aspect comprises a pictorial data storing unit that stores color pictorial data of a plurality of pictures, a pictorial data analyzing unit that performs an operation to analyze and digitize each kind of pictorial information on brightness, saturation and hue of the color pictorial data stored in the pictorial data storing unit, an average data operation unit that performs an operation to average the pictorial information analyzed in the pictorial data analyzing unit, a first data adding unit that adds an encoded pictorial information code of the pictorial information averaged in the average data operation unit, to the color pictorial data, a setting unit that sets each kind of the pictorial information, a pick-out unit that picks out the color pictorial data matching the pictorial information set in the setting unit from the color pictorial data of the plurality of the pictures stored in the pictorial data storing unit, based on the pictorial information set in the setting unit and the pictorial information code of the averaged pictorial information added to the color pictorial data in the first data adding unit, and a displaying unit that displays the color pictorial data which is picked out in the pick-out unit. Accordingly, the color pictorial data which has the desired lightness, the vividness and the tone can be immediately picked out and displayed. Further, analyzing the color pictorial data as a reference picture enables the user to compare other pictures with the reference picture, and to classify the pictures. The difference in judging the lightness, the vividness and the tone by each individual user can be eliminated.

BRIEF DESCRIPTION OF THE DRAWINGS

FIG. 3 is an explanatory diagram of an inner structure of retrieval information adding data stored in a user comment area;

FIG. 4 is an explanatory diagram of a maker note area data storing section in a maker note area;

FIG. 10 is an explanatory diagram of a table of ranges for color image automatic setting;

FIG. 16 is an explanatory view of the automatic retrieval of the image having the desired color image from the entire color pictorial data.

DETAILED DESCRIPTION

Figure 1:
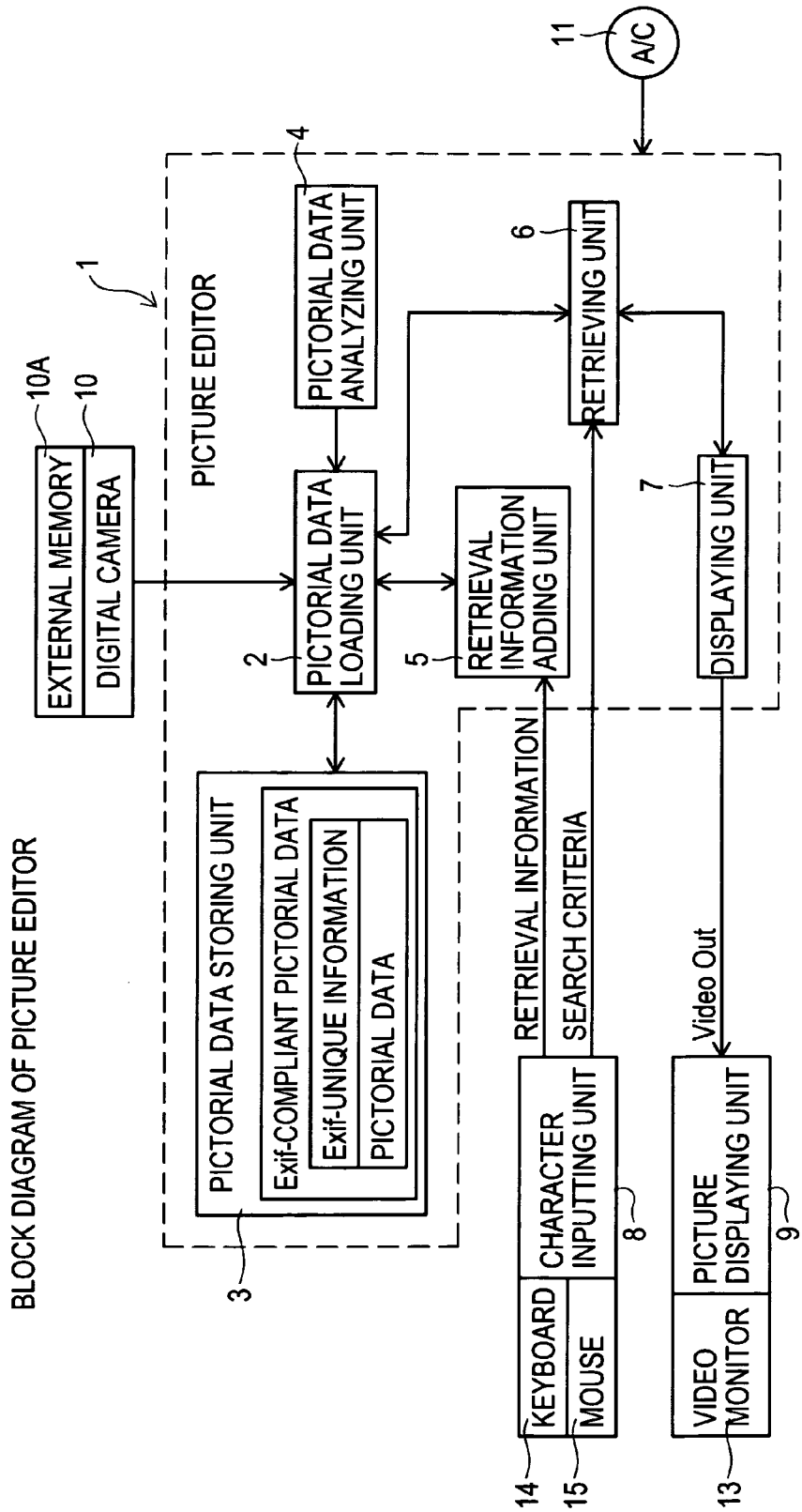
FIG. 1 is a block diagram of a picture editor of the disclosure.

A detailed description of an aspect of a picture editor embodying the disclosure will now be given referring to the accompanying drawings. FIG. 1 is a block diagram of the picture editor in the disclosure. A picture editor 1 comprises a pictorial data loading unit 2, a pictorial data storing unit 3, a pictorial data analyzing unit 4, a retrieval information adding unit 5, a retrieving unit 6, and a displaying unit 7. The picture editor 1 also comprises a serial interface, a parallel interface, a USB interface and a power unit, which are not shown. (A memory card interface may also be provided).

A character inputting unit 8, a picture displaying unit 9 and a digital camera 10 are connectable to the picture editor 1 through cables. An A/C adaptor 11 is also connectable to the picture editor 1 for power supply.

Noted that a printer may be connected to the picture editor 1 if necessary. The printer is better to have color printing capability and to be a color printer which can provide high-quality color printing with high contrast.

The pictorial data loading unit 2 loads pictorial data from the digital camera 10, and the pictorial data is stored in the pictorial data storing unit 3, by a signal from the retrieval information adding unit 5. The pictorial data stored in the pictorial data storing unit 3 is sent to the pictorial data analyzing unit 4, and the analyzed data is sent back to the pictorial data storing unit 3 in which the analyzed data is added to the pictorial data stored in the pictorial data storing unit 3, by the signal from the retrieval information adding unit 5. Further, the analyzed-data-added pictorial data which matches search criteria is picked out and sent to the retrieving unit 6, by a signal from the retrieving unit 6.

Figure 2:
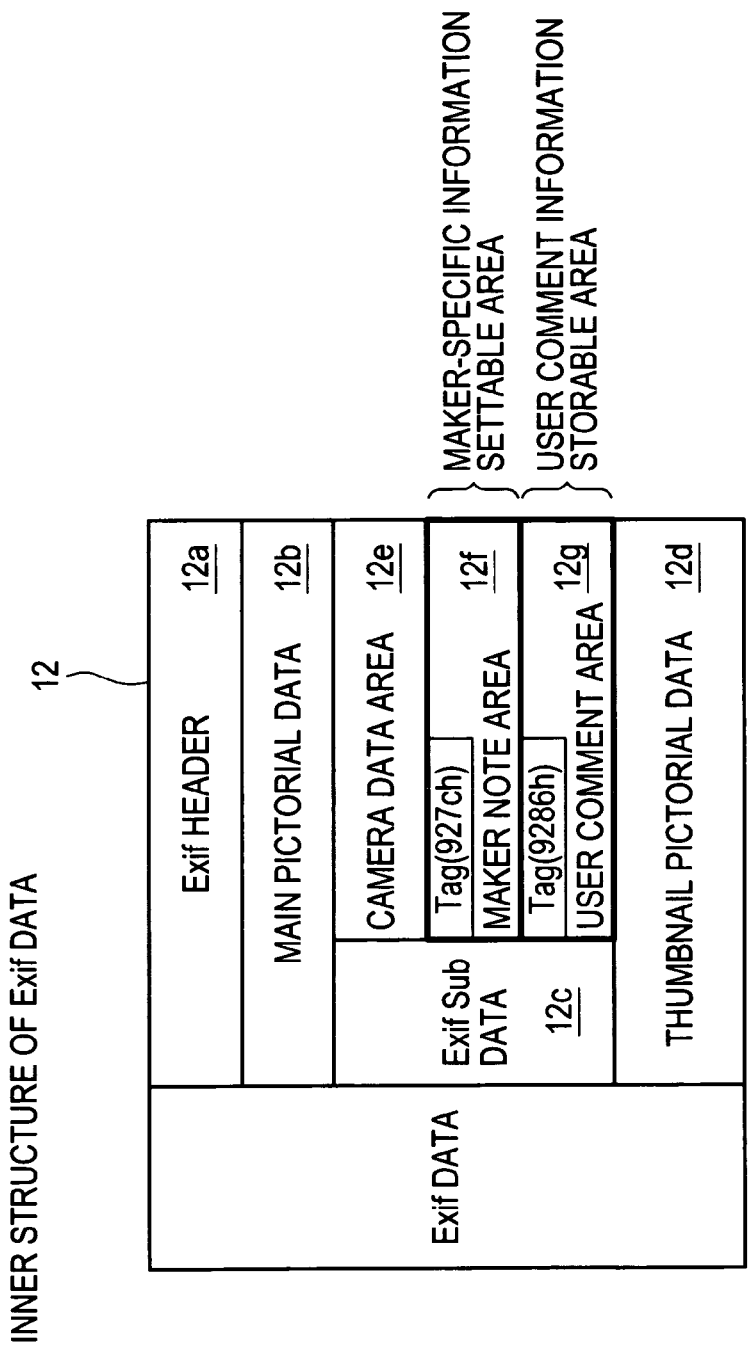
FIG. 2 is an explanatory diagram of an inner structure of Exif data.

The pictorial data storing unit 3 stores the pictorial data in an Exif-compliant pictorial data format which is also a file format of the digital camera 10. FIG. 2 is an explanatory diagram of an inner structure of Exif data. As shown in FIG. 2, Exif data 12 comprises an Exif header 12*a*, main pictorial data 12*b*, Exif sub data 12*c*, and thumbnail pictorial data 12*d*. The Exif sub data 12*c* includes a camera data area 12*e* which stores picture-taking information, a maker note area 12*f* which stores maker-specific information, and a user comment area 12*g* which stores comment information by a user. The user comment area 12*g* stores the data analyzed in the pictorial data analyzing unit 4. If the user comment area 12*g* does not exist or has no room, the maker note area 12*f* is used.

An inner structure of retrieval information adding data stored in the user comment area 12*g* is shown in FIG. 3. FIG. 3 is an explanatory diagram of an inner structure of retrieval information adding data stored in the user comment area. For instance, color image is written into a Tag No. 1, an average value of the sum of brightness of all the pixels is written into a Tag No. 2, an average value of the sum of saturation of all the pixels is written into Tag No. 3, an average value of the mode of hue distribution of all the pixels is written into a Tag No. 4, and a position of the mode of the hue distribution of all the pixels is written into a Tag No. 5. Further, FIG. 4 shows a maker note area data storing section 22 of the maker note area 12*f*. FIG. 4 is an explanatory diagram of a maker note area data storing section in the maker note area. For instance, an entry number of the Tags is written into a position of offset 8, and Tag No. 1 data is written into a position of offset 10, and the Tag No. 2 data is written into a position of offset 22.

It is noted that a media which the digital camera 10 comprises may be used as an external memory 10A.

The pictorial data analyzing unit 4 performs the operation to analyze each kind of pictorial information on the brightness, the saturation and the hue of the color pictorial data stored in the pictorial data storing unit 3, and to digitize the color pictorial data. The pictorial data analyzing unit 4 also performs the operation to average the analyzed pictorial information. Furthermore, the pictures are divided into a plurality of groups according to the averaged pictorial information of the pictures, and the pictorial information of the pictures divided into the groups and images of the color pictorial data of the pictures are classified and encoded.

The retrieval information adding unit 5 adds each kind of the digitized and averaged pictorial information on the brightness, the saturation and the hue of the color pictorial data stored in the pictorial data storing unit 3, to the color pictorial data stored in the pictorial data storing unit 3. The retrieval information adding unit 5 adds an information code of the pictures divided into the groups according to the averaged pictorial information of the pictures and the images of the color pictorial data of the pictures which are classified, to the color pictorial data stored in the pictorial data storing unit 3.

The retrieving unit 6 picks out the color pictorial data matching the set search criteria from a plurality of the color pictures stored in the pictorial data storing unit 3, according to the pictorial information code of the averaged pictorial information added to the color pictorial data. Under the set search criteria, the retrieving unit 6 also picks out the color pictorial data of the matching pictures from the plurality of the color pictures stored in the pictorial data storing unit 3, according to the information code of the images of the color pictorial data of the pictures which are classified.

The displaying unit 7 outputs the color pictorial data picked out in the retrieving unit 6 to the picture displaying unit 9. A video monitor 13 of a high-quality color liquid crystal display is used as the picture displaying unit 9.

A keyboard 14 is used as the character inputting unit 8 when the color image is inputted into the retrieval information adding unit 5 and the search criteria is inputted into the retrieving unit 6. The keyboard 14 is also used for start-up, shut-off and command input of the picture editor 1.

When instructions for the process in the retrieving unit 6 and the retrieval information adding unit 5 are displayed in the video monitor 13, a mouse 15 is also used for the character inputting unit 8, which improves a user interface. Noted that a switch panel and a joy stick may be used for the character inputting unit 8.

Operation of the picture editor 1 of the above structures will be explained with reference to FIGS. 5 to 16. A "Step" in a flowchart is abbreviated to "S".

Figure 5:
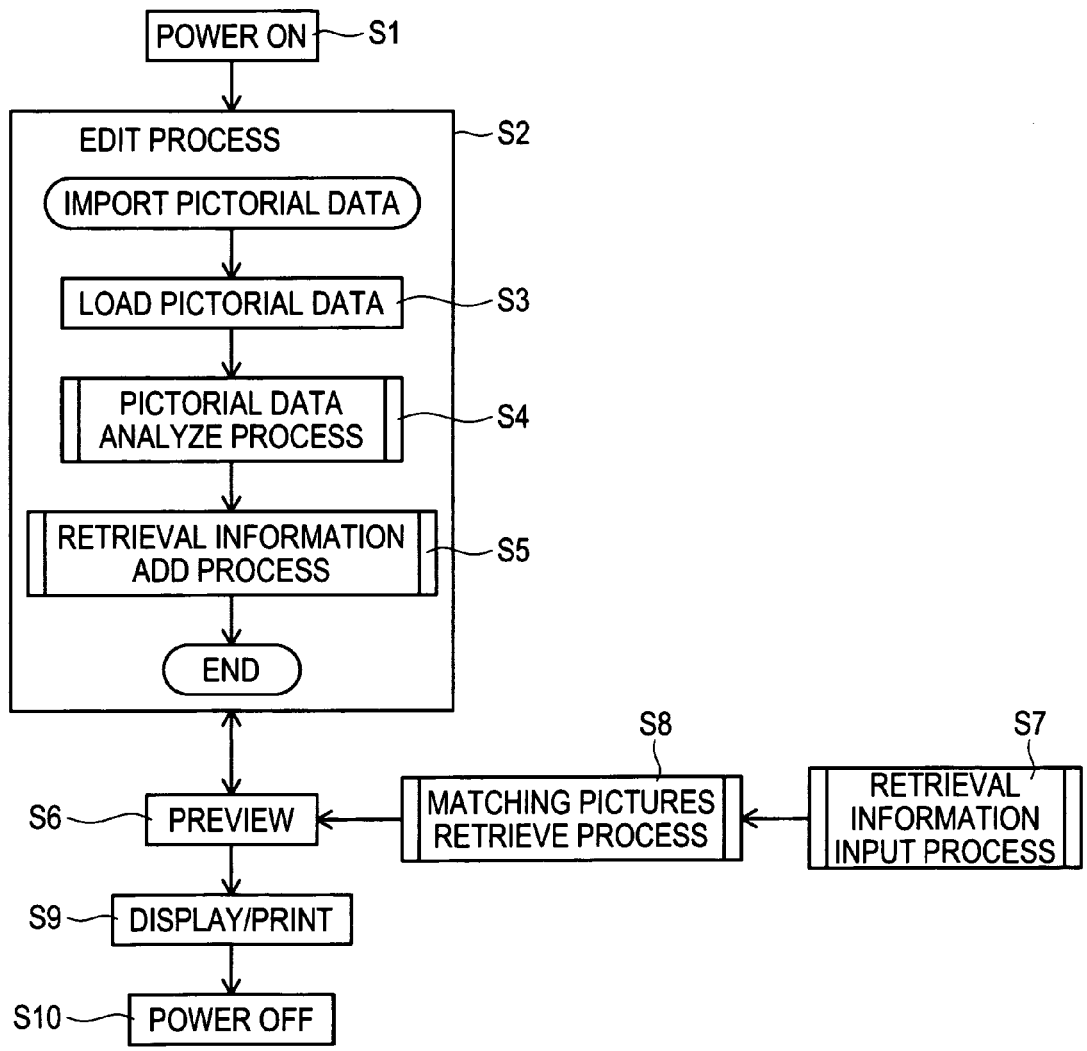
FIG. 5 is a state transition diagram of the picture editor.

FIG. 5 is a state transition diagram of the picture editor. The operation of the picture editor 1 is briefly explained with FIG. 5.

Firstly, the picture editor 1 is turned on (S1). An edit process is selected with the keyboard 14 or the mouse 15 (S2). The color pictorial data is imported from the digital camera 10 and stored in the pictorial data storing unit 3. The stored color pictorial data is loaded to the pictorial data analyzing unit 4

(S3). The color pictorial data is analyzed in the pictorial data analyzing unit 4 (S4). Retrieval information according to the analysis of the color pictorial data is added to the imported color pictorial data (S5).

When a scrapbook 19 described later (see FIG. 14) is created by using the color pictorial data edited as above, the color picture which matches the image to be stuck thereon should be selected. For that purpose, the picture editor 1 is set in a preview mode with the keyboard 14 or the mouse 15 (S6). The retrieval information which matches the image is inputted (S7). The color image which fit the image best is selected from the plurality of the color pictures which are picked out by a matching pictures retrieve process and displayed on the video monitor 13 (S8). The selected color picture is placed in the preview mode (S6). The completed scrapbook 19 is displayed on the video monitor 13, and printed on the printer (S9). The picture editor 1 is turned off.

Next, each process will be explained in detail.

Figure 6:
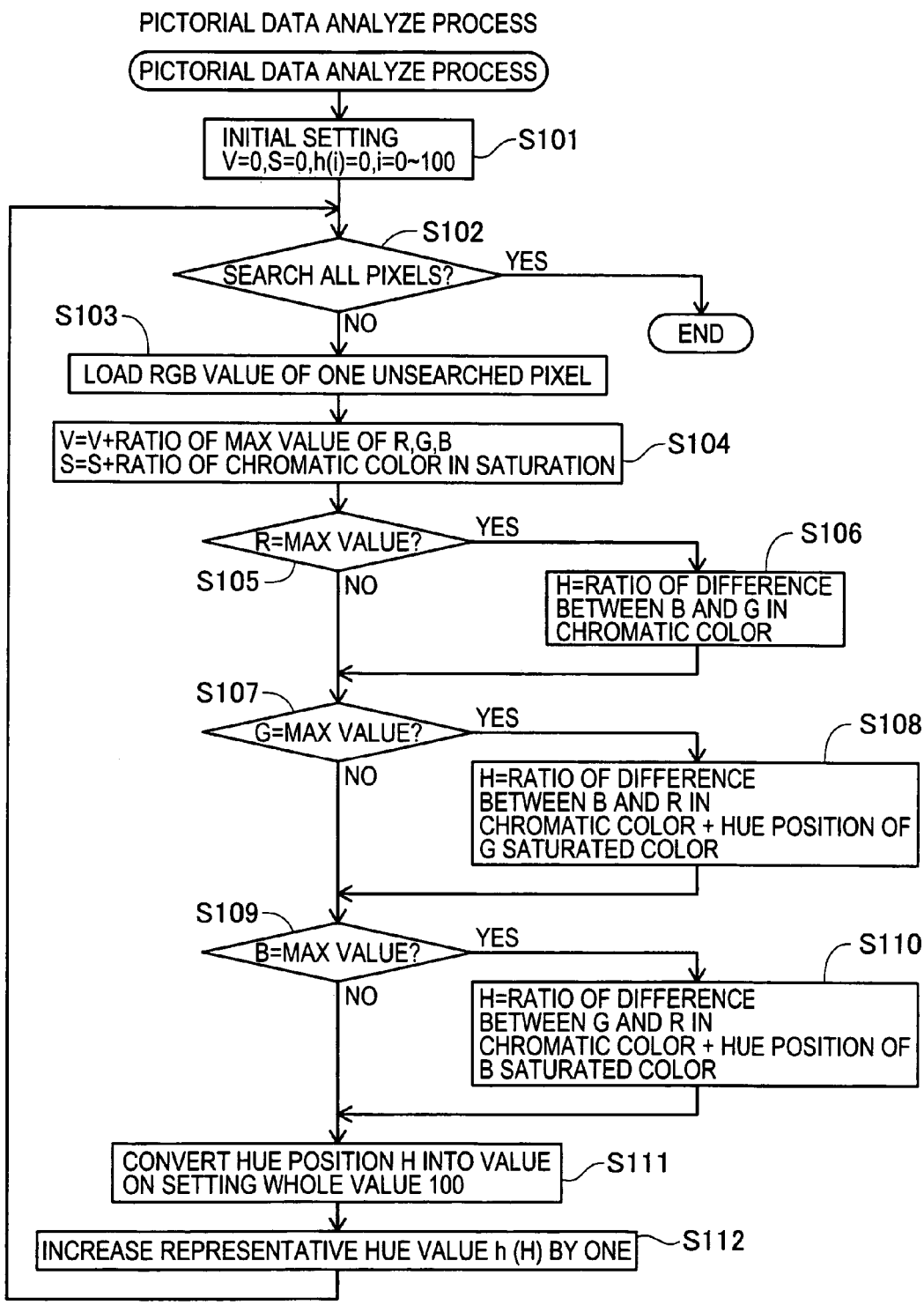
FIG. 6 is a flowchart of a pictorial data analyze process.

Firstly, a pictorial data analyze process is explained with reference to FIG. 6. FIG. 6 is a flowchart of the pictorial data analyze process. The pictorial data analyzing unit 4 performs the operation to analyze each kind of the pictorial information on the brightness (V), the saturation (S) and the hue (H) of the color pictorial data stored in the pictorial data storing unit 3, based on the RGB data (R: red, G: Green, B: Blue), and to digitize the color pictorial data.

The pictorial data analyzing unit 4 is initialized (S101). The color pictorial data stored in the pictorial data storing unit 3 is imported, and all the pixels of the color pictorial data are searched. It is verified whether all the pixels of the color pictorial data are searched (S102). If all the pixels are not searched (S102, NO), the RGB data of one unsearched pixel is loaded (S103). The operation is performed to digitize the brightness (V) and the saturation (S) of the loaded RGB data (S104). Next, the hue (H) is digitized. In S105, the pictorial data analyzing unit 4 verifies whether the R data is the maximum value. If the R data is not the maximum value (S105, NO), the flow advances to S107. If the R data is the maximum value (S105, YES), the flow advances to S106. In S106, the operation is performed to digitize the hue (H) based on the proportion of the difference between B and G in chromatic color, and then the flow goes on to S107. In S107, the pictorial data analyzing unit 4 verifies whether the G data is the maximum value. If the G data is not the maximum value (S107, NO), the flow advances to S109. If the G data is the maximum value (S107, YES), the flow goes on to S108. In S108, the operation is performed to digitize the hue (H) based on the proportion of the difference between B and R in the chromatic color and a hue position of G saturated color, and then the flow goes on to S109. In S109, it is verified whether the B data is the maximum value. If the B data is not the maximum value (S109, NO), the flow advances to S111. If the B data is the maximum value (S109, YES), the flow goes on to S110. In S110, the operation is performed to digitize the hue (H) based on the proportion of the difference between G and R in the chromatic color and a hue position of B saturated color, and then the flow goes on to S111. In S111, the hue position H is converted into a value at the time of setting the value of the whole hue position 100. In S112, a representative hue value h (H) of the one pixel is increased by one, and the flow returns to S102. The process through S102 to S112 is performed on all the pixels of the color pictorial data to analyze and digitize each kind of the pictorial information on the brightness (V), the saturation (S) and the hue (H) of the color pictorial data based on the RGB data. When all the pixels are searched, (S102, YES), the flow ends.

Figure 7:
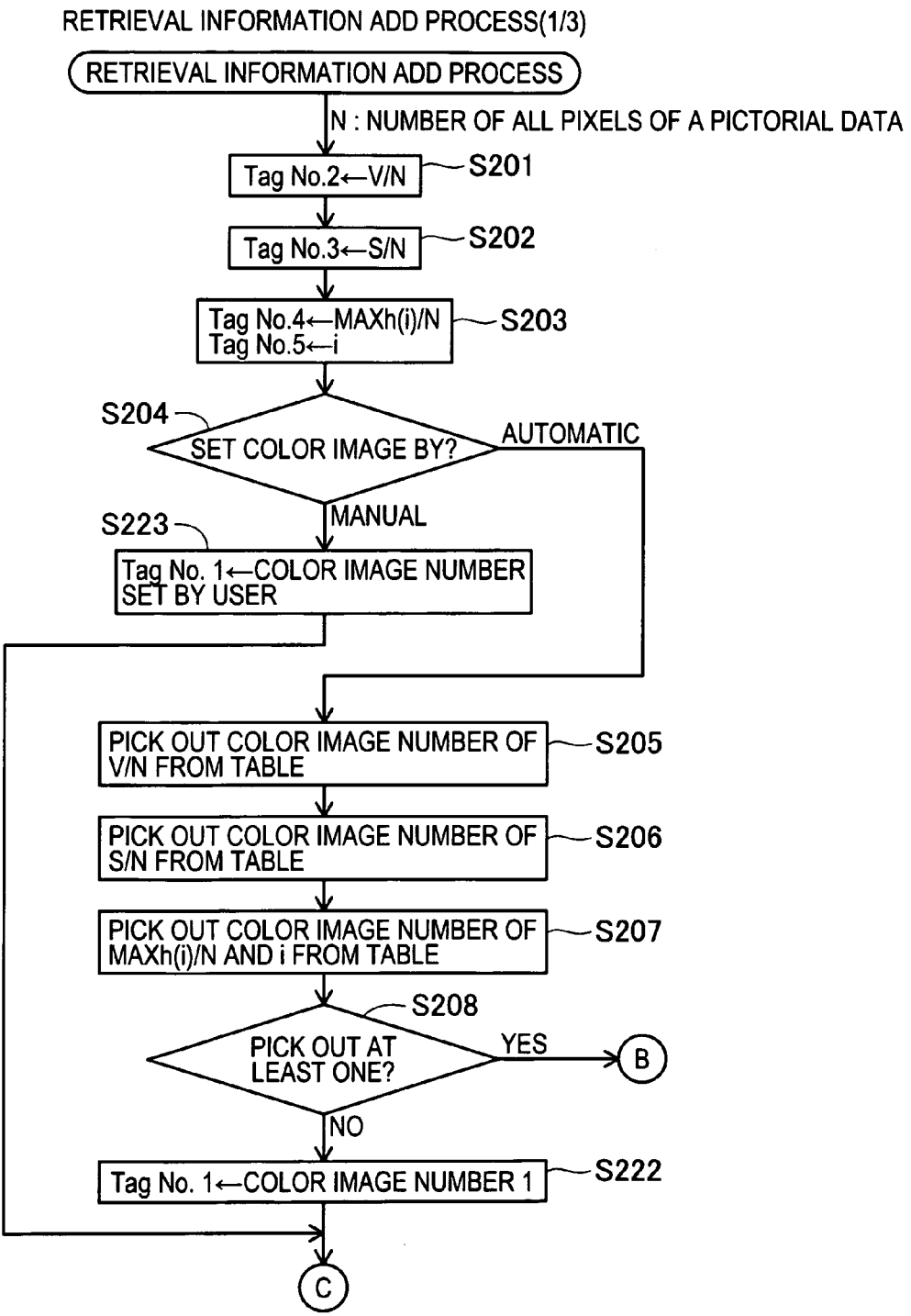
FIG. 7 is a flowchart of a retrieval information add process.
Figure 8:
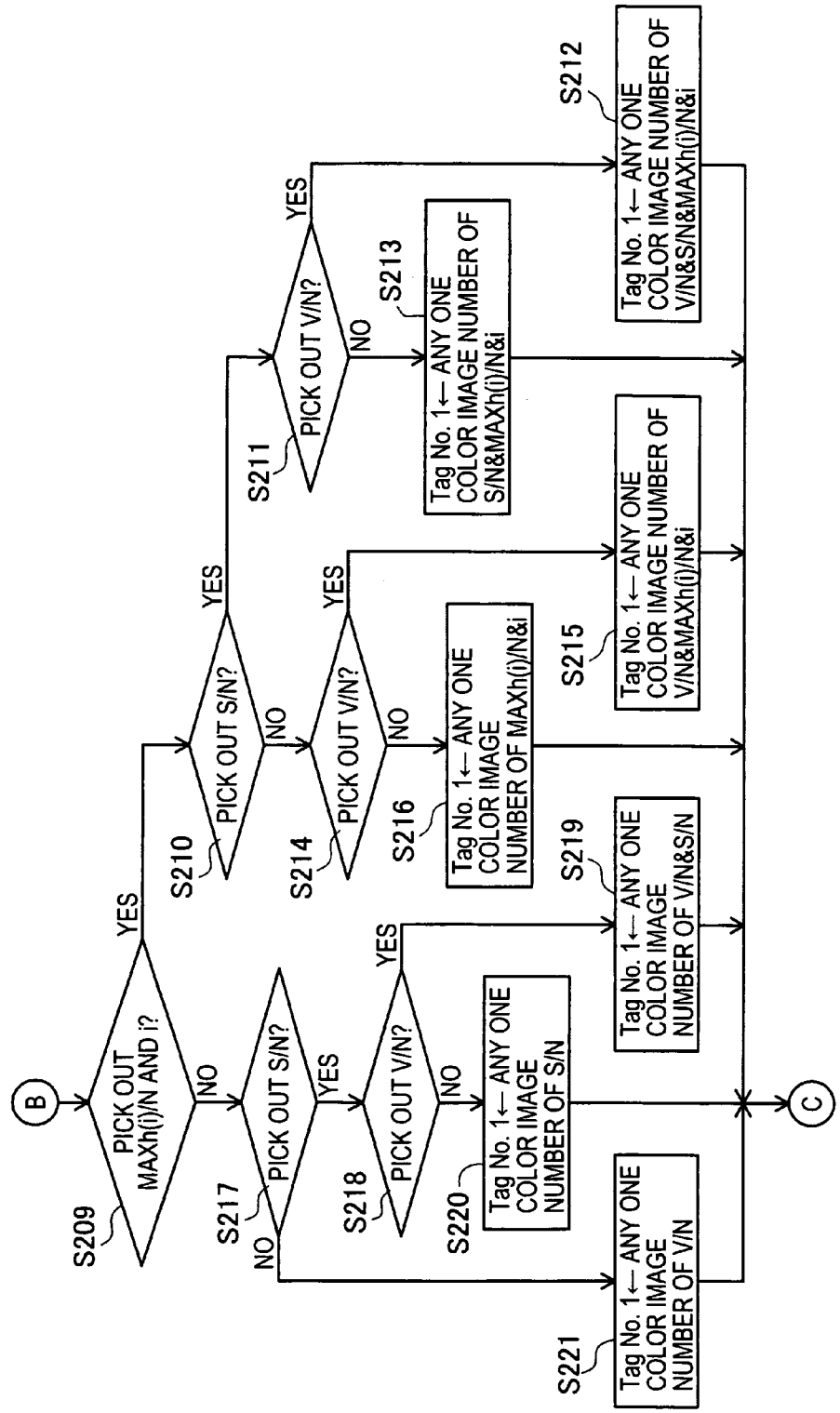
FIG. 8 is a flowchart of the retrieval information add process.
Figure 9:
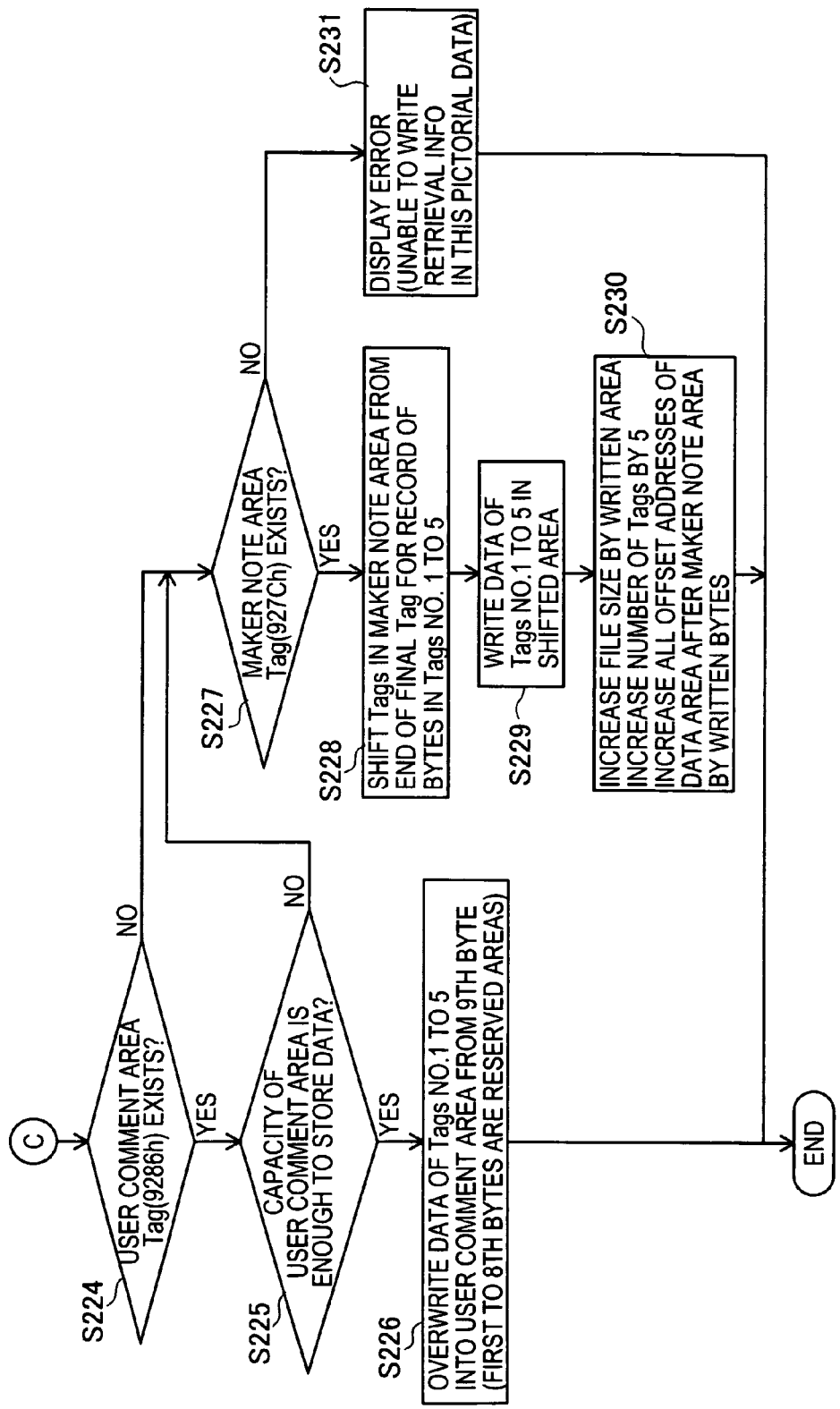
FIG. 9 is a flowchart of the retrieval information add process.

Next, a retrieval information add process will be explained with reference to FIGS. 7 to 9. FIGS. 7, 8 and 9 are flowcharts of the retrieval information add process. In this flow, each kind of the averaged pictorial information on the brightness, the saturation and the hue of the color pictorial data which is analyzed and digitized in the pictorial data analyze process shown in FIG. 6 is added to the color pictorial data stored in the pictorial data storing unit 3. The information code of the pictures divided into the groups, according to the averaged pictorial information of the pictures and the images of the color pictorial data of the pictures which are classified, is added to the color pictorial data stored in the pictorial data storing unit 3.

In S201, the operation is performed to obtain an average value V/N of the sum of the brightness of all the pixels. A recording process of the average value V/N in the Tag No. 2 of the retrieval information adding data 16 shown in FIG. 3 is set up. The flow advances to S202, and the operation is performed to obtain an average value S/N of the sum of the saturation of all the pixels. The recording process of the average value S/N in the Tag No. 3 of the retrieval information adding data 16 shown in FIG. 3 is set up. The flow advances to S203, and the operation is performed to obtain an average value MAXh(i)/N of the mode of the hue distribution of all the pixels. The retrieval information adding unit 5 sets up the recording process of the average value MAXh(i)/N in the Tag No. 4 of the retrieval information adding data 16 shown in FIG. 3. At the same time, the operation is performed to obtain a position i of the mode of the hue distribution of all the pixels, and sets up the recording process of the value of the position i in the Tag No. 5.

The flow goes on to S204. In S204, it is determined whether the color image is automatically set based on a table of ranges for color-image automatic setting 17 shown in FIG. 10, or the color image is manually set in a color-image manual setting screen 18 shown in FIG. 11.

FIG. 10 is an explanatory diagram of the table of ranges for color image automatic setting. As shown in FIG. 10, in the table of ranges for color-image automatic setting 17, the averaged values of the pictorial information are divided into the plurality of the ranges, and the color image of the color picture is assigned to each of the ranges with a color image number. Therefore, the averaged values of each kind of the pictorial information can be applied to any divided ranges in the table of ranges for color-image automatic setting 17, so that the color image of the color picture can be picked out with the color image number.

Figure 11:
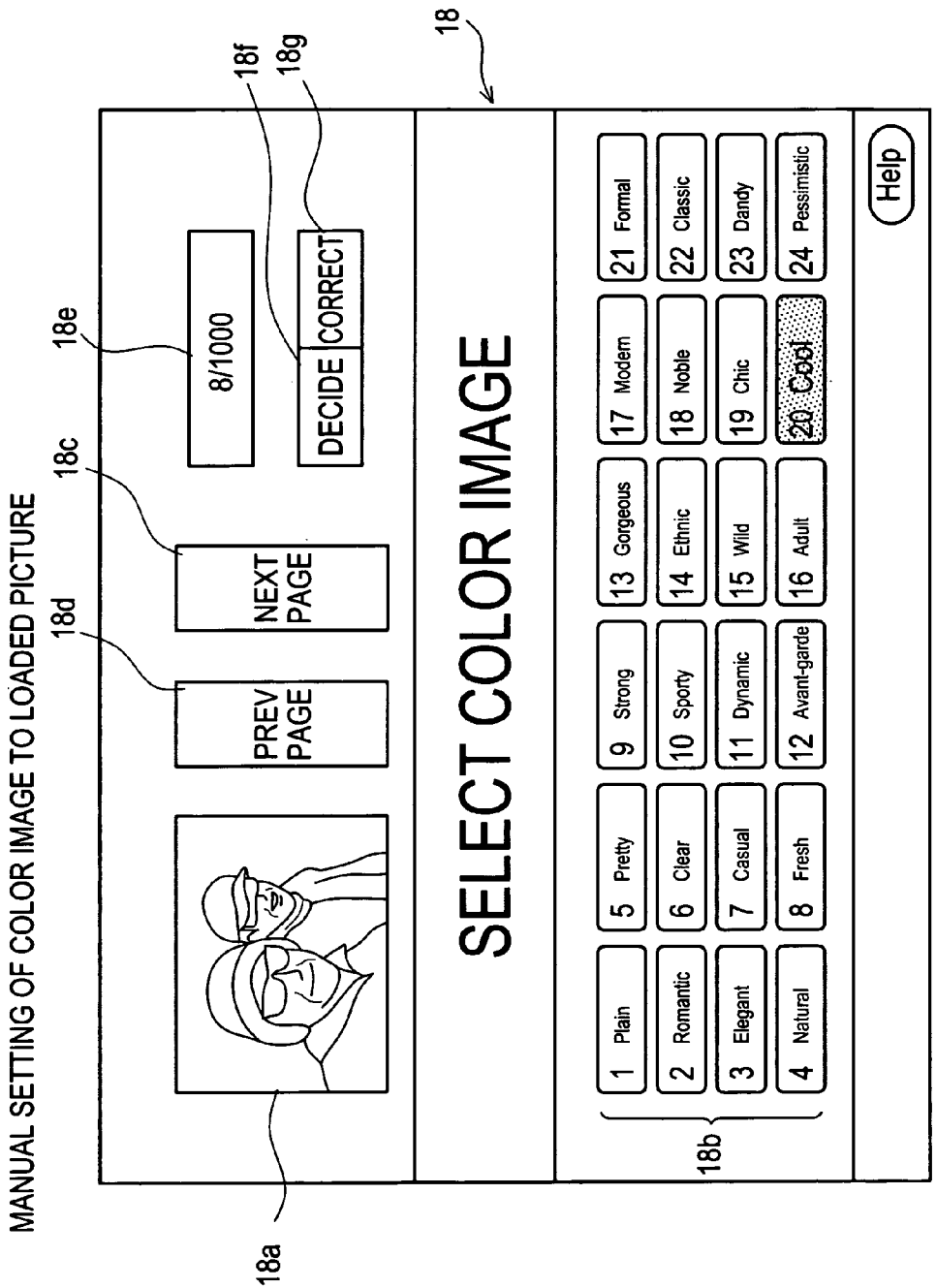
FIG. 11 is an explanatory view of a manual setting process of color image to a loaded picture.

FIG. 11 is an explanatory view of a manual setting process of the color image to the loaded picture. The color image of the color-image set picture 18a displayed on the color-image manual setting screen 18 can be selected from a keyword group 18b, and determined with a decide button 18f This will be explained later in detail.

If "automatic" is selected in S204, the flow advances to S205. In S205, all the color image numbers of which the ranges include the value of V/N (hereinafter, "the color image numbers of V/N") are picked out from the table of ranges for color-image automatic setting 17 in FIG. 10. The flow goes on to S206, and all the color image numbers of which the ranges include the value of S/N (hereinafter, "the color image numbers of S/N") are picked out from the table of ranges for color-image automatic setting 17. The flow further goes on to S207, and all the color image numbers of which the ranges include the value of MAXh(i)/N and i (hereinafter, "the color image numbers of MAXh(i)/N and i") are picked out from the table of ranges for color-image automatic setting 17.

The flow advances to S208. In S208, it is judged whether any color image number is picked out in each step of S205 to S207. If at least one of the color image numbers is picked out (S208, YES), the flow goes on to S209, and it is verified whether at least one of the color image numbers of MAXh(i)/N and i are picked out. If at least one of the color image numbers of MAXh(i)/N and i is picked out (S209, YES), the flow advances to S210, it is verified whether the color image numbers of S/N are picked out. If at least one of the color image numbers of S/N is picked out (S210, YES), the flow goes on to S211, and it is verified whether the color image numbers of V/N are picked out. If at least one of the color image numbers of V/N is picked out (S211, YES), the flow advances to S212. In S212, any one color image number of V/N, S/N, MAXh(i)/N and i (the color image number of which the difference between the center value of the range and each value of V/N, S/N, MAXh(i)/N and i is the least of all) is picked out. The retrieval information adding unit 5 sets up to write the selected color image number into the Tag. No. 1. The flow goes on to S224.

The explanation will be made back to S211. If no color image number of V/N is picked out (S211, NO), the flow goes on to S213. In S213, any one color image number of S/N, MAXh(i)/N and i (the color image number of which the difference between the center value of the range and each value of S/N, MAXh(i)/N and i is the least of all) is picked out. The selected color image number is set in readiness for being written into the Tag. No. 1. The flow goes on to S224.

The explanation will be made back to S210. If no color image number of S/N is picked out (S210, NO), the flow goes on to S214, and it is verified whether the color image numbers of V/N are picked out. If at least one of the color image numbers of V/N is picked out (S214, YES), the flow advances to S215. In S215, any one color image number of V/N, MAXh(i)/N and i (the color image number of which the difference between the center value of the range and each value of V/N, MAXh(i)/N and i is the least of all) is picked out. The selected color image number is set in readiness for being written into the Tag. No. 1. The flow goes on to S224.

The explanation will be made back to S214. If no color image number of V/N is picked out (S214, NO), the flow goes on to S216. In S216, any one color image number of MAXh(i)/N and i (the color image number of which the difference between the center value of the range and each value of MAXh(i)/N and i is the least of all) is picked out. The selected color image number is set in readiness for being written into the Tag. No. 1. The flow goes on to S224.

The explanation will be made back to S209. If no color image number of MAXh(i)/N and i is picked out (S209, NO), the flow advances to S217, and it is verified whether the color image numbers of S/N are picked out. If at least one of the color image numbers of S/N is picked out (S217, YES), the flow advances to S218, and it is verified whether the color image numbers of V/N are picked out. If at least one of the color image numbers of V/N is picked out (S218, YES), the flow advances to S219. In S219, any one color image number of V/N and S/N (the color image number of which the difference between the center value of the range and each value of V/N and S/N is the least of all) is picked out. The selected color image number is set in readiness for being written into the Tag. No. 1. The flow goes on to S224.

The explanation will be made back to S218. If no color image number of V/N is picked out (S218, NO), the flow goes on to S220, and any one of color image number of S/N (the color image number of which the difference between the center value of the range and the value of S/N is the least of all) is picked out. The selected color image number is set in readiness for being written into the Tag. No. 1. The flow goes on to S224.

The explanation will be made back to S217. If no color image number of S/N is picked out (S217, NO), the flow goes on to S221, and any one color image number of V/N (the color image number of which the difference between the center value of the range and the value of V/N is the least of all) is picked out. The selected color image number is set in readiness for being written into the Tag. No. 1. The flow advances to S224.

The explanation will be made back to S208. If no color image number is picked out (S208, NO), the flow goes on to S222. The selected color image number is set in readiness for being written into the Tag. No. 1. The flow goes on to S224.

The explanation will be made back to S204. If "manual" is selected in S204, the flow advances to S223. The retrieval information adding unit 5 sets up to write the color image number that the user designated into the Tag. No. 1. The flow goes on to S224.

In S224, it is determined whether Tag (9286h) which indicates the user comment area 12g exists or not by the search of the Tag (9286h) in the inner structure of the Exif data shown in FIG. 2. If the Tag (9286h) which indicates the user comment area 12g exists (S224, YES), the flow advances to S225. In S225, it is judged whether the capacity of the user comment area 12g is large enough to store the desired information. If the capacity of the user comment area 12g is large enough to store the desired information (S225, YES), the flow goes on to S226. In S226, the data of the Tags No. 1 to 5 which is ready to be stored is overwritten into the user comment area 12g from 9th byte therein (the first through 8th bytes are reversed areas), and then the flow ends.

In S224, if the Tag (9286h) which indicates the user comment area 12g does not exist (S224, NO), the flow goes on to S227. In S225, if the capacity of the user comment area 12g is insufficient (S225, NO), the flow goes on to S227, too.

In S227, it is determined whether the Tag (927Ch) which indicates the maker note area 12f exists or not, by the search of the Tag (927Ch) in the inner structure of the Exif data shown in FIG. 2. If the Tag (927Ch) which indicates the maker note area 12f exists (S227, YES), the flow advances to S228. In S228, the Tags in the maker note area 12f are shifted from the end of the final Tag to make the area for the record of the data in the Tags No. 1 through 5.

The flow advances to S229, and the data of the Tags No. 1 through 5 which is ready to be stored is written in the shifted area.

The flow advances to S230. In S230, the file size of the maker note area 12f is increased for the written area, and the numbers of the Tags of the maker note area 12f is increased by 5. Further, all offset addresses of the data area after the maker note area 12f are increased by the bytes already written.

If the Tag (927Ch) indicating the maker note area 12f does not exist (S227, NO), the flow advances to S231. The error message such as "it is impossible to write the retrieval information in the pictorial file", and the flow ends.

Now that the pictorial data analyze process shown in FIG. 6 and the pictorial information add process shown in FIGS. 7 to 9 have been performed for each of the color pictorial data, the retrieval information is added to the color pictorial data of all the pictures stored in the pictorial data storing unit 3.

Figure 12:
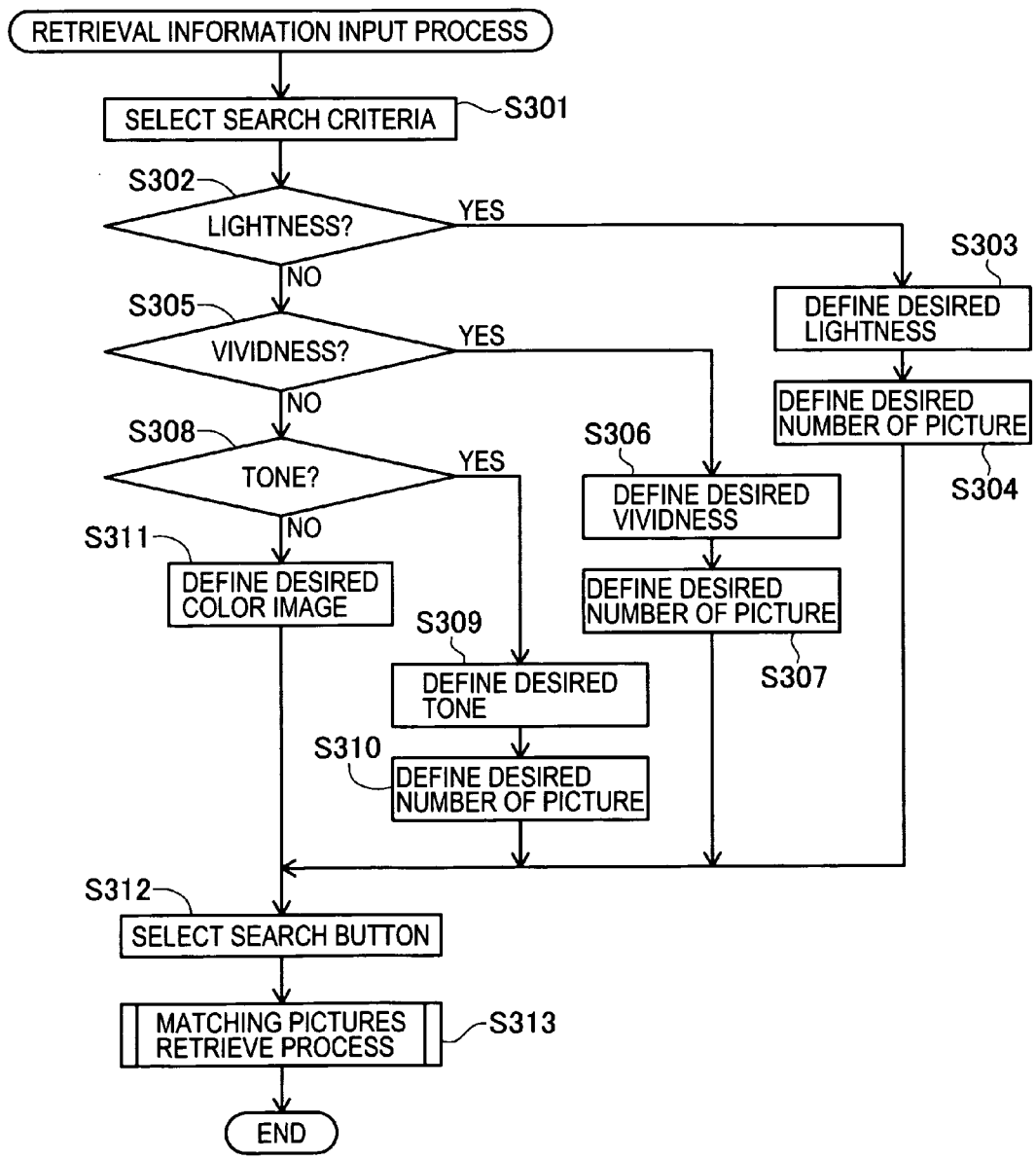
FIG. 12 is a flowchart of a retrieval information input process.

Next, a retrieval information input process for picking-out of the desired color image data by the retrieval information will be explained with reference to FIG. 12. FIG. 12 is a flowchart of the retrieval information input process. It is noted that the brightness, the saturation and the hue corresponds to lightness, vividness and tone respectively in the flowchart.

Firstly, the search criteria is selected in S301. In S302, it is judged whether the search criteria is the lightness or not. If it is the lightness (S302, YES), the flow advances to S303 wherein the desired lightness is defined. Next, the flow goes on to S304 wherein the desired number of the pictures to be picked out is designated, and then to S312.

In S302, if the search criteria is not the lightness (S302, NO), the flow advances to S305 and it is judged whether the search criteria is the vividness or not. If it is the vividness (S305, YES), the flow advances to S306 wherein the desired vividness is defined. Next, the flow goes on to S307 wherein the desired number of the pictures to be picked out is designated, and then to S312.

In S305, if the search criteria is not the vividness (S305, NO), the flow advances to S308 and it is judged whether the search criteria is the tone or not. If it is the tone (S308, YES), the flow advances to S309 wherein the desired tone is defined. Next, the flow goes on to S310 wherein the desired number of the pictures to be picked out is designated, and then to S312.

In S308, if it is not the tone (S308, NO), the flow advances to S311. In S311, the desired color image is selected as the search criteria, and then the flow advances to S312.

In S312, a search button is selected to start the search. After the selection, the flow goes on to S313 and a matching pictures retrieve process is performed by the defined search criteria.

It is noted that each of the search criteria of the lightness, the vividness and the tone is defined individually in the retrieval information input process shown in FIG. 12, but may be done for the combination of them.

Figure 13:
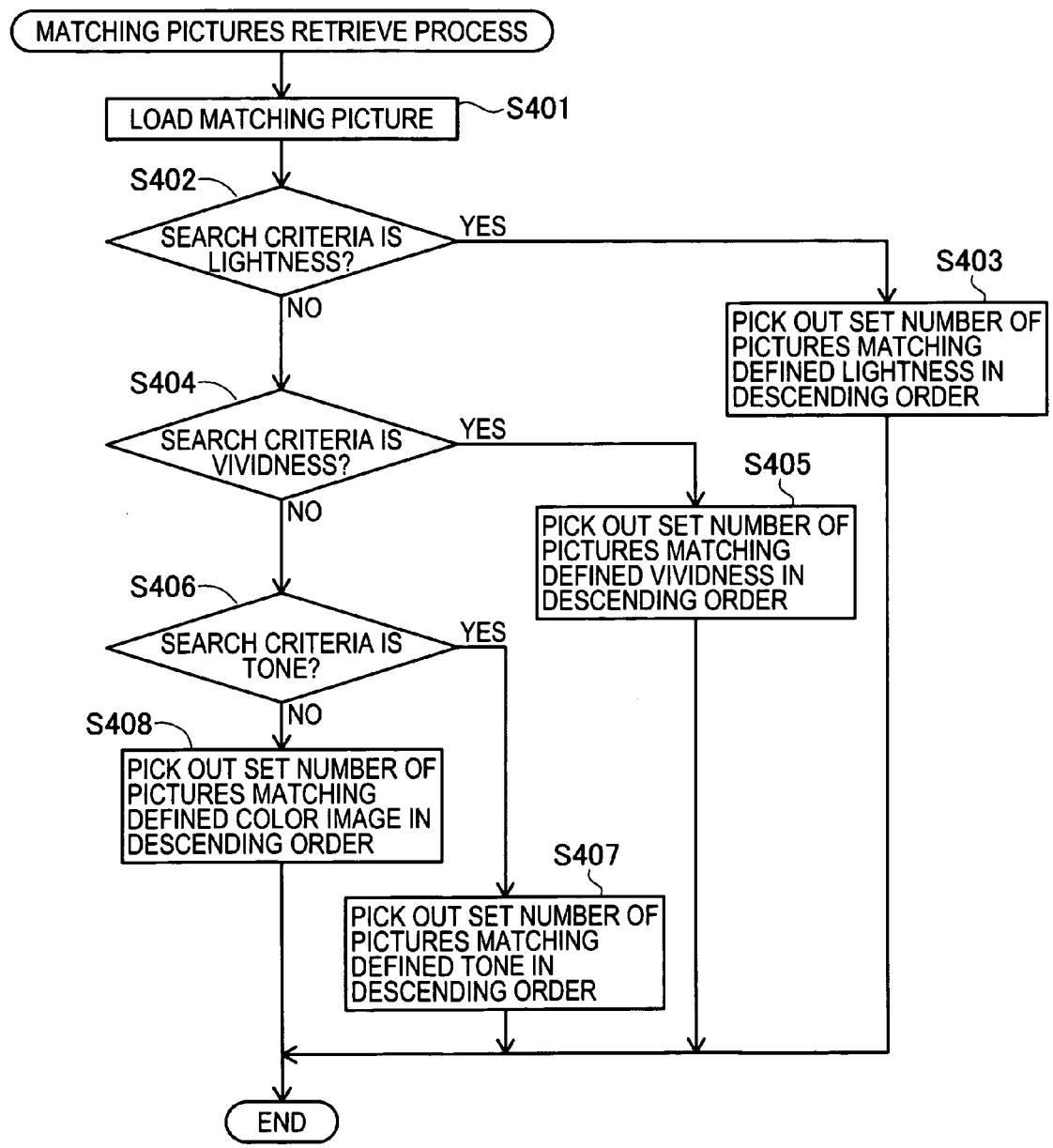
FIG. 13 is a flowchart of a matching pictures retrieve process.

Next, the matching pictures retrieve process in which the pictures are picked out by the search criteria defined in FIG. 12 will be explained with reference to FIG. 13. FIG. 13 is a flowchart of the matching pictures retrieve process.

Firstly, matching pictures are load in S401, and it is judged whether the search criteria is the lightness or not in S402. If it is the lightness (S402, YES), the flow advances to S403 wherein the designated number of the pictures which match the defined lightness are picked out in descending order, and then ends.

In S402, if the search criteria is not the lightness (S402, NO), the flow advances to S404 and it is judged whether the search criteria is the vividness or not. If it is the vividness (S404, YES), the flow advances to S405 wherein the designated number of the pictures which match the defined vividness are picked out in descending order, and then ends.

In S404, if the search criteria is not the vividness (S404, NO), the flow advances to S406 and it is judged whether the search criteria is the tone or not. If it is the tone (S406, YES), the flow advances to S407 wherein the designated number of the pictures which match the defined tone are picked out in descending order, and then ends.

In S406, if the search criteria is not the tone (S406, NO), the flow advances to S408 wherein the pictures which match the selected color image are picked out in descending order, and then ends.

Next, the screen display of the video monitor 13 which is connected to the picture editor 1 being operated as above will be explained.

The screen display of FIG. 11 is explained firstly. FIG. 11 is the explanatory view of the manual setting process of the color image to the loaded image. This screen display is shown when "manual" is selected for setting the color image in the retrieval information add process. In the color-image manual setting screen 18 displayed in the video monitor 13, there are shown the color-image set picture 18a, the keyword group 18b for the selection of the color image, a next page button 18c for going to the next page, a previous page button 18d for going back to the previous page, a page number input/page number display 18e, a decide button 18f for selecting the color image, and a correct button 18g for changing the color image.

The abovementioned display screen is used as follows: the color-image set picture 18a is selected with the next page button 18c and the previous page button 18d. The color image which matches the color-image set picture 18a is selected from the keyword group 18b for the selection of the color images, and decided with the decide button 18f. The page number displayed at the time is shown in the page number input/page number display 18e. If there is a page to be modified, the page to be modified is selected with the next page button 18c and the previous page button 18d, and the information of the image is reset with the correct button 18g. After that, the color image which matches the color-image set picture 18a is selected again from the keyword group 18b and determined with the decide button 18f. The color image is manually added to the color pictorial data stored in the pictorial data storing unit 3 while the pages are forwarded one by one. The abovementioned operation is performed with a pointer of the mouse 15. The display screen in FIG. 11 shows that "Cool" of the color image No. 20 is selected for the 8th of 1000 (8/1000) color picture. It is noted that it may be possible to select the page directly with the keyboard 14.

Figure 14:
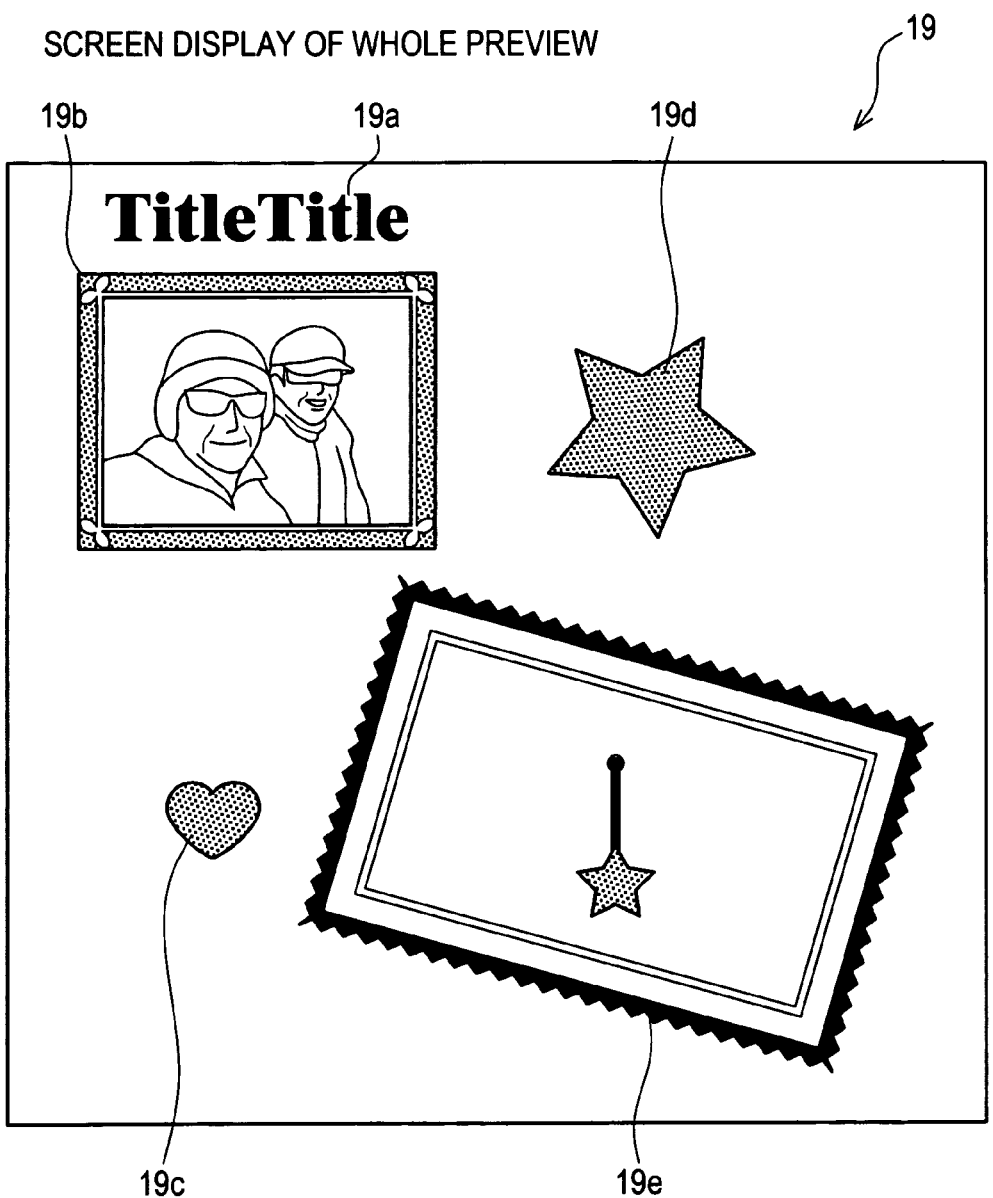
FIG. 14 is an exemplary view of a screen display of a whole preview for making of a scrapbook.
Figure 15:
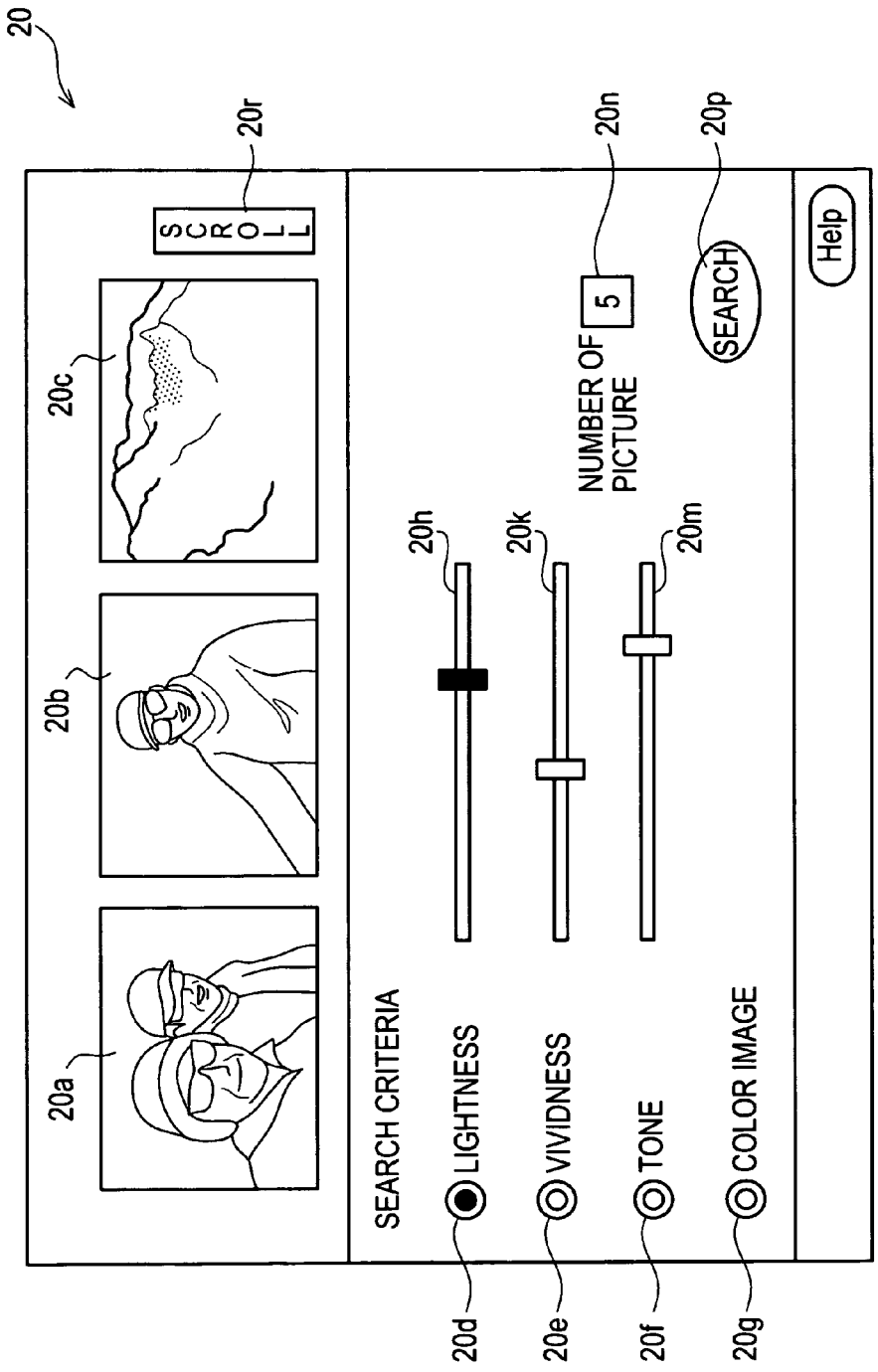
FIG. 15 is an explanatory view of an automatic retrieval of the image having the desired lightness, vividness, and tone from the entire color pictorial data.

Next, one example of using the picture editor 1 will be explained with reference to the screen display of the video monitor 13 shown in FIGS. 14 to 16. FIG. 14 is an exemplary view of the screen display of the whole preview for making of the scrapbook. FIG. 15 is an explanatory view of the automatic retrieval of the image having the desired lightness, vividness, and tone from the entire color pictorial data. FIG. 16 is an explanatory view of the automatic retrieval of the image having the desired color image from the entire color pictorial data.

For making of the scrapbook 19 as shown in FIG. 14, items 19a to 19e matching the image read from the pictorial data of the respective items are stuck on the scrapbook 19. When the need for the color picture having the slight lightness comes about during the sticking process, it takes much time and is an onerous task for a user to search voluminous color pictures one by one to find the desired color picture. Moreover, the color picture can be hardly selected from the voluminous pictures which match the search criteria and have no extreme differences. Therefore, the simple process of loading the color pictorial data which matches the image by using the picture editor 1 will be explained.

Firstly, the screen display of the video monitor 13 is changed to the screen display as shown in FIG. 15 by key entry with the keyboard 14. Herein, the screen display is explained in detail. In a picture automatic retrieval screen 20 of the desired HSV (H: Hue, S: Saturation, V: Brightness) displayed in the video monitor 13, matching pictures 20a, 20b and 20c which match the search criteria are displayed in descending order. It is possible to scroll the screen down to see more matching pictures if any by a scroll button 20r. The four words as search criteria are "lightness", "vividness", "tone" and "color image". At each heads of signs of the search criteria, there are placed a spot 20d for defining the lightness, a spot 20e for defining the vividness, a spot 20f for defining the tone and a spot 20g for defining the color image. When one of the spots is selected with the mouse 15, the selected spot turns to a different color, which means the search criteria of the selected spot has been designated. At each ends of the signs of the search criteria, there are placed a slider 20h for setting the level of the lightness, a slider 20k for setting the vividness, and a slider 20m for setting the tone. When one of the spots is selected, a controller of the corresponding slider turns to a different color. Furthermore, a number of picture display part 20n which displays a number of the matching pictures, inputted with the keyboard 14, is placed with a search button 20p.

The abovementioned display screen is used as follows: when the spot 20d for defining the lightness is selected with the mouse 15, the spot 20d turns the different color, which means the lightness has been selected as the search criteria. As mentioned above, the controller of the slider 20h also turns the different color. The level of the lightness is set at a position indicating the slight lightness by the controller being moved with the mouse 15. Next, "5" is inputted with the keyboard 14 as the number of the pictures to be retrieved, and the search button 20p is selected with the mouse 15. The search starts, and then the 5 matching pictures which match the defined lightness are displayed in descending order from the left side. In this case, only three images are displayed. The scroll button 20r is selected with the mouse 15 to scroll the screen down, so that the other two more pictures can be displayed. If the displayed pictures do not match the image, other matching pictures can be found by a fine-tuning of the controller of the slider 20h. In this case, the leftmost matching picture 20a shown first is the color picture which has the desired lightness. The matching picture 20a is loaded, and stuck at a position of the item 19b on the scrapbook 19 after the display goes back to the screen display of FIG. 14. Finally, the scrapbook 19 has been finished.

When the "color image" is selected as the search criteria in the picture automatic retrieval screen 20 to define the desired HSV shown in FIG. 15, a color image automatic retrieval screen 21 shown in FIG. 16 is displayed in the screen display of the video monitor 13. In the color image automatic retrieval screen 21 displayed in the video monitor 13, retrieved matching pictures 21a, 21b and 21c are displayed in descending order. It is possible to scroll the screen down to see more matching pictures if any by the scroll button 21d. A keyword group 21e for the selection of the color image, a retrieve button 21f for the retrieval of the color image, and a matching picture number display 21g for the display of the number of the retrieved chosen pictures are displayed.

The color image automatic retrieval screen 21 is used as follows: when the color image automatic retrieval screen 21 shown in FIG. 16 is displayed, the desired color image is selected from the keyword group 21e for the selection of the color image with the mouse 15. The retrieve button 21f is selected with the mouse 15, and then all of the retrieved matching pictures 21a, 21b and 21c which match the selected color image are displayed in descending order. Further, the number of the matching pictures is shown in the matching picture number display 21g.

The screen display in FIG. 16 shows that "Cool" is selected from the keyword group 21e for the selection of the color image, and then all of the retrieved matching pictures 21a, 21b and 21c which are retrieved by the retrieve button 21f are displayed in descending order. The matching picture number display 21g shows that the number of the matching pictures is 10.

As described above, the desired color pictorial data can be obtained by being automatically selected from the keyword group 21e for the selection of the color image. In this case, the retrieved matching picture 21a is the desired color pictorial data, so that the matching picture 20a can be stuck at the position of the item 19b on the scrapbook 19 after the display goes back to the screen display of FIG. 14.

The operation as above and the data used is based on the pictorial data analyze process in FIG. 6, the retrieval information add process in FIGS. 7 to 9, the retrieval information input process in FIG. 12 and the matching pictures retrieve process in FIG. 13.

As described in detail above, the picture editor 1 of the aspect comprises the pictorial data storing unit 3 that stores the color pictorial data of the plurality of the pictures, and the pictorial data analyzing unit 4 that performs an operation to analyze and digitize each kind of the pictorial information on the brightness, the saturation, and the hue of the color pictorial data stored in the pictorial data storing unit 3, and that performs the operation to average the analyzed pictorial information. The picture editor 1 further comprises the first retrieval information adding unit 5 that adds the pictorial information code of the pictorial information which is averaged in the average data operation unit 4, to the color pictorial data, the character inputting unit 8 that sets the pictorial information, the retrieving unit 6 that picks out the color pictorial data matching the set pictorial information, based on the pictorial information set in the character inputting unit 8 and the pictorial information code of the averaged pictorial information which is added to the color pictorial data in the first pictorial information adding unit 5. Accordingly, the color pictorial data which has the desired lightness, the vividness and the tone can be immediately picked out and displayed. Further, analyzing the color pictorial data as the reference picture enables the user to compare other pictures with the reference picture, and to classify the pictures. The difference in judging the lightness, the vividness and the tone by each individual user can be eliminated.

Additionally, the averaged pictorial information which is added to the color pictorial data in the first pictorial information adding unit 5 is stored in the user comment area 12g which is provided in the storage area storing the unique information of the color picture, so that it is unnecessary to set the original format. Further, the compatibility of the data can be maintained. The user comment area 12g can be also used as the external memory of the picture editor 1.

The picture editor 1 further comprises the table of ranges for color-image automatic setting 17 that stores the keyword group 18b, 21e whereby the pictures are divided into a plurality of the groups according to the averaged pictorial information of the pictures, and the pictures divided into the groups and the images of the color pictorial data of the pictures are classified, the retrieval information adding unit 5 that sets one of keyword group 18b, 21e matching the pictorial information of the color pictorial data which is averaged in the average data operation unit 4 that performs the operation to average the pictorial information based on the table of ranges for color-image automatic setting 17, and that adds the information code of the set keyword group 18b, 21e to the color pictorial data, and the character inputting unit 8 and the retrieving unit 6 that define the keyword group 18b, 21e, wherein the color pictorial data of which the keyword group 18b, 21e matches the keyword group 18b, 21e defined by the character inputting unit 8 and the retrieving unit 6 for the retrieval is picked out and displayed. Accordingly, the desired picture can be immediately searched and found not only by the lightness, the vividness, and the tone but also by the image. Also, assigning the words to the image can provide the search suitable for the human interface.

The picture editor 1 further comprises the user comment area 12g that stores the information code of the keyword group 18b, 21e added to the color pictorial data in the retrieval information adding unit 5, provided in the storage area storing the unique information of the color pictorial data. Accordingly, the picture editor 1 does not need to form own format. The compatibility of the data can be maintained. Furthermore, the user comment area 12g can be used as the external memory of the picture editor 1.

The disclosure may be embodied in other specific forms without departing from the spirit or essential characteristics thereof. For instance, analyzing and digitizing the pictorial data to define a position of the color image can be also useful in the field of design in which the color is used as the common language.

While the aspect has been shown and described, it is to be understood that this disclosure is for the purpose of illustration and that various changes and modifications may be made without departing from the scope of the disclosure as set forth in the appended claims.

What is claimed is:

1. A picture editor comprising:
   a pictorial data storing unit that stores color pictorial data of a plurality of pictures;
   a pictorial data analyzing unit that performs an operation to analyze and digitize each kind of pictorial information on brightness, saturation and hue of the color pictorial data stored in the pictorial data storing unit;
   an average data operation unit that performs an operation to average the pictorial information analyzed in the pictorial data analyzing unit;
   a color table that stores a plurality of color image ranks whereby the pictures are divided into a plurality of groups according to the averaged pictorial information of the pictures, and the pictures divided into the groups and images of the color pictorial data of the pictures are classified, a predetermined value range being allotted corresponding to each of the color image ranks in each of the averaged pictorial information;
   a data adding unit that sets one of the color image ranks matching the pictorial information of the color pictorial data which is averaged in the average data operation unit that performs the operation to average the pictorial information based on the color table, and adds an information code of the set color image rank to the color pictorial data, the one color image rank being determined so that a difference between a value of the pictorial information averaged in the average data operation unit and a center value of each predetermined value range becomes a least value in all of the predetermined value ranges;
   a setting unit that sets one of the color image ranks;
   a pick-out unit that picks out the color pictorial data of which the color image rank matches the color image rank set in the setting unit from the color pictorial data of the plurality of the pictures stored in the pictorial data storing unit, based on the color image rank set in the setting unit and the information code of the color image rank added to the color pictorial data in the data adding unit; and
   a displaying unit that displays the color pictorial data which is picked out in the pick-out unit.

2. The picture editor according to claim 1,
   wherein the information code of the color image rank added to the color pictorial data in the data adding unit is stored in the user data area provided in a storage area storing unique information of the color pictorial data.

3. The picture editor according to claim 1,
   wherein the setting unit selects at least one from the plurality of the color image ranks which are displayed in words in the displaying unit.

4. The picture editor according to claim 1,
   wherein the pictorial data analyzing unit performs the operation to analyze and digitize each kind of the pictorial information on the brightness, the saturation, and the hue of the color pictorial data stored in the pictorial data storing unit based on red-green-blue data.

5. The picture editor according to claim 1,
   wherein the pick-out unit selects at least one item of the brightness, the saturation and the hue, sets the desired level of the item within an allowable range, and retrieves the color pictorial data of the set level.

6. The picture editor according to claim 1,
   wherein the color pictorial data stored in the pictorial data storing unit includes a maker data area that stores maker-specific information and a user data area provided in the storage area storing the unique information of the color pictorial data.

7. The picture editor according to claim 6,
   wherein the maker data area is used when a storage capacity of the user data area is insufficient.

8. The picture editor according to claim 1, further comprising:
   a pictorial data loading unit that loads the color pictorial data from an external device and stores the color pictorial data in the pictorial data storing unit.

9. The picture editor according to claim 8,
   wherein the external device is also used as an external memory in conjunction with the pictorial data storing unit.

* * * * *